US012809080B1

(12) United States Patent
Li et al.

(10) Patent No.: US 12,809,080 B1
(45) Date of Patent: Nov. 24, 2026

(54) SHOEBOX LIGHT

(71) Applicant: Torshare Ltd, Shenzhen (CN)

(72) Inventors: Mantie Li, Shenzhen (CN); Yiye Liu, Shenzhen (CN); Jian Peng, Shenzhen (CN); Liang Chen, Shenzhen (CN); Shanglong Wu, Shenzhen (CN); Kun Yin, Shenzhen (CN)

(73) Assignee: Torshare Ltd, Shenzhen (CN)

(*) Notice: Subject to any disclaimer, the term of this patent is extended or adjusted under 35 U.S.C. 154(b) by 0 days.

(21) Appl. No.: 19/393,527

(22) Filed: Nov. 18, 2025

(30) Foreign Application Priority Data

Jul. 21, 2025 (CN) ......................... 202511000488.2

(51) Int. Cl.
*F21V 8/00* (2006.01)

(52) U.S. Cl.
CPC ........... *G02B 6/005* (2013.01); *G02B 6/0068* (2013.01); *G02B 6/0085* (2013.01)

(58) Field of Classification Search
CPC .. F21Y 2105/10; F21Y 2105/00; F21V 5/007; F21V 23/007; F21V 8/00; F21S 41/265; F21S 41/43; F21S 41/141; G02B 6/005
See application file for complete search history.

(56) References Cited

U.S. PATENT DOCUMENTS

| | | | | |
|---|---|---|---|---|
| 8,662,721 | B2 * | 3/2014 | Calvin | B64D 47/06 362/333 |
| 2010/0165601 | A1 * | 7/2010 | Yoon | G02F 1/133603 313/46 |
| 2014/0098515 | A1 * | 4/2014 | Pickett | G09F 13/18 362/23.13 |
| 2016/0010811 | A1 * | 1/2016 | Benitez | F21S 41/143 362/147 |

* cited by examiner

*Primary Examiner* — William J Carter

(57) ABSTRACT

A shoebox light, including a lamp body, a light source plate, a lens plate, a power supply box, and a power supply assembly; the power supply box is disposed at a rear end of the lamp body, the light source plate is disposed at a bottom of the lamp body, the light source plate is provided with light source assemblies arranged in an array, and the lens plate is disposed on a side of the light source plate away from the bottom of the lamp body and is provided with a plurality of optical lens packages; each light source assembly includes six lamp beads arranged in three rows and two columns; the power supply box includes a box body and a cover body, the cover body is rotatably connected at one end to the lamp body, and fastened at another end to the bottom of the lamp body.

9 Claims, 3 Drawing Sheets

SHOEBOX LIGHT

CROSS-REFERENCE TO RELATED APPLICATION

The present disclosure claims the benefit of Chinese patent application No. 202511000488.2, filed on Jul. 21, 2025, which is incorporated herein by reference in its entirety.

TECHNICAL FIELD

The present disclosure belongs to the technical field of tube light fixture, and in particular relates to a shoebox light.

BACKGROUND

A shoebox light is an outdoor lighting fixture, and is named so because its shape resembles a shoe box. The shoebox light is widely used in various scenarios such as parking lot lighting, stadium lighting, and road lighting. Currently, for most shoebox lights on the market, the lens plate should be replaced manually to achieve desired optical emission angles. Some special optics also require the cooperation between the lens plate and the light source plate to meet the optical requirements, making the operation relatively cumbersome, and user-unfriendly.

SUMMARY

An objective of the present disclosure is to provide a shoebox light capable of forming different lighting patterns just by turning on or off the corresponding lamp beads in the light source assembly without replacing the lens plate, while also facilitating maintenance of the power supply assembly.

To achieve the above objective, the following technical solutions are adopted.

A shoebox light, comprising a lamp body, a light source plate, a lens plate, a power supply box, and a power supply assembly; wherein the power supply box is disposed at a rear end of the lamp body, the light source plate is disposed at bottom of the lamp body, and the light source plate is provided with a plurality of light source assemblies arranged in an array; the lens plate is disposed outside the light source plate, and is provided with a plurality of optical lens packages in one-to-one correspondence with the light source assemblies;

- each of the light source assemblies comprises a first lamp bead, a second lamp bead, a third lamp bead, a fourth lamp bead, a fifth lamp bead, and a sixth lamp bead arranged in three rows and two columns, wherein
- the first lamp bead and the second lamp bead are positioned at an uppermost row, and arranged left-right,
- the third lamp bead, and the fourth lamp bead are positioned at a middle row, and arranged left-right,
- the fifth lamp bead, and the sixth lamp bead are positioned at a lowermost row, and arranged left-right;
- the first lamp bead, the second lamp bead, the third lamp bead, the fourth lamp bead, the fifth lamp bead, and the sixth lamp bead are electrically connected to the power supply assembly, and connected in parallel with each other; wherein when any two rows of lamp beads are illuminated or all three rows of lamp beads are illuminated, light emitted thereby passes through corresponding lens optical package, resulting in different lighting patterns of the shoebox light;
- the power supply box comprises a box body, defining a power supply cavity inside, for mounting the power supply assembly, and a cover body installed on the box body, wherein the cover body is rotatably connected at one end to the bottom of the lamp body via a hinge, and fastened at an opposite end to the bottom of the lamp body via a connection screw.

In a preferred embodiment, when the first lamp bead, the second lamp bead, the third lamp bead, and the fourth lamp bead are simultaneously illuminated, light emitted by the first lamp bead, light emitted by the second lamp bead, light emitted by the third lamp bead, and light emitted by the fourth lamp bead collectively pass through corresponding lens optical packages, and the lighting pattern of the shoebox light is T3.

In a preferred embodiment, when the third lamp bead, the fourth lamp bead, the fifth lamp bead, and the sixth lamp bead are simultaneously illuminated, light emitted by the third lamp bead, light emitted by the fourth lamp bead, light emitted by the fifth lamp bead, and light emitted by the sixth lamp bead collectively pass through corresponding lens optical packages, and the lighting pattern of the shoebox light is T5.

In a preferred embodiment, when the first lamp bead, the second lamp bead, the third lamp bead, the fourth lamp bead, the fifth lamp bead, and the sixth lamp bead are simultaneously illuminated, light emitted by the first lamp bead, light emitted by the second lamp bead, light emitted by the third lamp bead, light emitted by the fourth lamp bead, light emitted by the fifth lamp bead, and light emitted by the sixth lamp bead collectively pass through corresponding lens optical packages, and the lighting pattern of the shoebox light is T4.

In a preferred embodiment, the lamp body is provided with a heat dissipation assembly at top, and the heat dissipation assembly comprises a plurality of first heat dissipation ribs and a plurality of second heat dissipation ribs, both extending along a length direction of the lamp body, wherein the first heat dissipation ribs have a height less than that of the second heat dissipation ribs, and the first heat dissipation ribs and the second heat dissipation ribs are alternately arranged at intervals.

In a preferred embodiment, a module switch is configured on the power supply box to regulate an on/off state of the lamp beads and the lighting pattern, and the module switch is electrically connected to the power supply assembly.

In a preferred embodiment, the lamp body defines a light source cavity at bottom for mounting the light source plate; the lamp body comprises a drainage groove at top distal to the power supply box, the drainage groove is configured with a drainage hole in a sidewall communicating with the light source cavity; wherein when the light source plate is mounted in the light source cavity, a drainage gap is formed between an inner wall of the light source cavity and the light source plate.

In a preferred embodiment, the lamp body comprises an inclined surface at top sloping downwardly from the power supply box toward the drainage groove, the first heat dissipation ribs and the second heat dissipation ribs are disposed on the inclined surface, and cooperate therewith to form a water guide channel.

In a preferred embodiment, a waterproof sealing ring is disposed between the light source plate and the lens plate; the lens plate comprises a plurality of fastening screws arranged along the periphery of the lens plate, wherein the lens plate is fastened to the light source plate via the fastening screws to compress the waterproof sealing ring therebetween.

The implementation of the present disclosure provides a shoebox light, which, compared to the prior art, has the following advantageous effects.

Without replacing the lens plate, different light patterns can be formed by turning on or off the corresponding lamp beads in the light source assembly, thus meeting different lighting requirements and making operation simple and convenient. Additionally, when maintenance of the power supply assembly is needed later, only the connecting screw at the opposite end of the cover body of the power supply box needs to be removed. Meanwhile, since said one end of the cover body is rotatably connected to the lamp body via a hinge, the cover body will not fall from the lamp body, making maintenance convenient and the operation simple.

BRIEF DESCRIPTION OF THE DRAWINGS

To provide a clearer illustration of the technical solutions of the embodiments of the present disclosure, a brief introduction to the drawings of the embodiments will be provided below.

Figure 1:
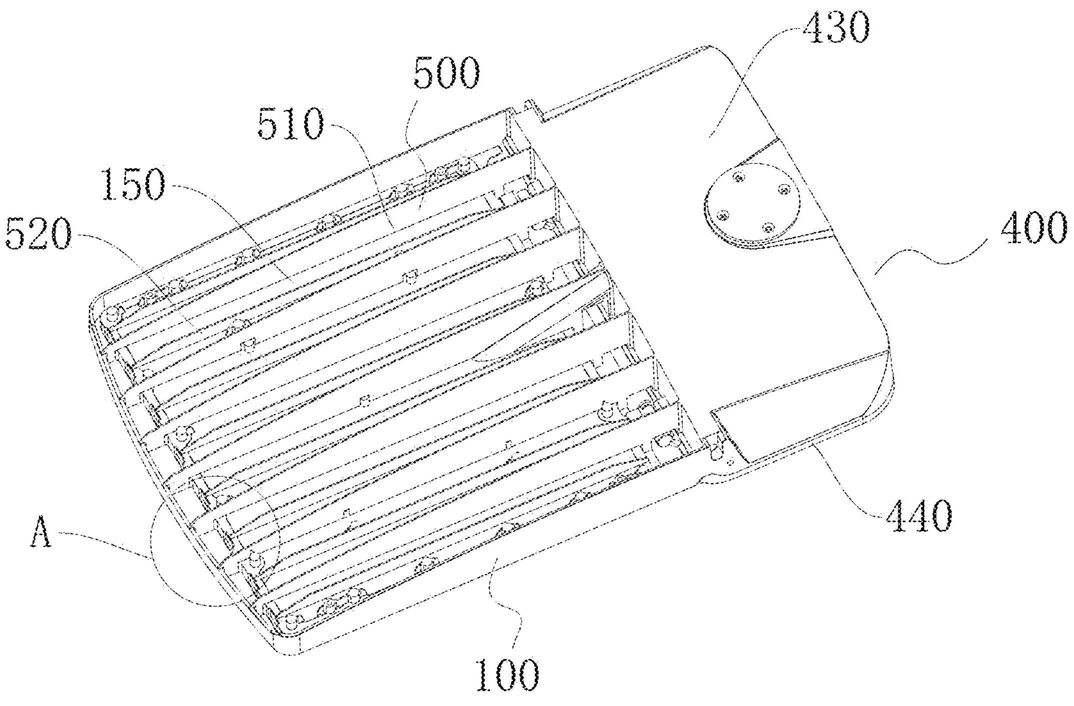
FIG. 1 is a schematic diagram of the structure of a shoebox light provided in an embodiment of the present disclosure.

REFERENCE SIGNS IN THE DRAWINGS lamp body 100; light source cavity 110; drainage groove 120; drainage hole 130; drainage gap 140; inclined surface 150; water guide channel 160; light source plate 200; light source assembly 210; first lamp bead 211; second lamp bead 212; third lamp bead 213; fourth lamp bead 214; fifth lamp bead 215; sixth lamp bead 216; lens plate 300; optical lens package 310; power supply box 400; power supply assembly 410; power supply cavity 420; box body 430; cover body 440; hinge 450; connecting screw 460; module switch 470; heat dissipation assembly 500; first heat dissipation rib 510; second heat dissipation rib 520; fastening screw 600.

DETAILED DESCRIPTION

In conjunction with the drawings and embodiments, a more detailed description of the specific embodiments of the present disclosure is provided below. The embodiments described below are provided for illustrating the present disclosure but are not for limiting the scope of the present disclosure.

In the description of the present disclosure, it should be understood that the terms “up”, “down”, “left”, “right”, “front”, “rear”, “top”, “bottom”, and the like indicating the orientation or position relationship are based on the orientation or positional relationship shown in the drawings. These terms are used for convenience in describing the present disclosure, and simplifying the description, and do not indicate or imply that the device or element referred to must have a specific orientation, or be constructed or operated in a specific orientation. Therefore, these terms should not be construed as limiting the present disclosure. It should be understood that in the present disclosure, the terms “first”, “second”, and the like are used to describe various information, but the information should not be limited to these terms. These terms are used only to distinguish information of the same type from each other. For example, within the scope of the present disclosure, the “first” information can also be referred to as the “second” information, and similarly, the “second” information can also be referred to as the “first” information.

Figure 2:
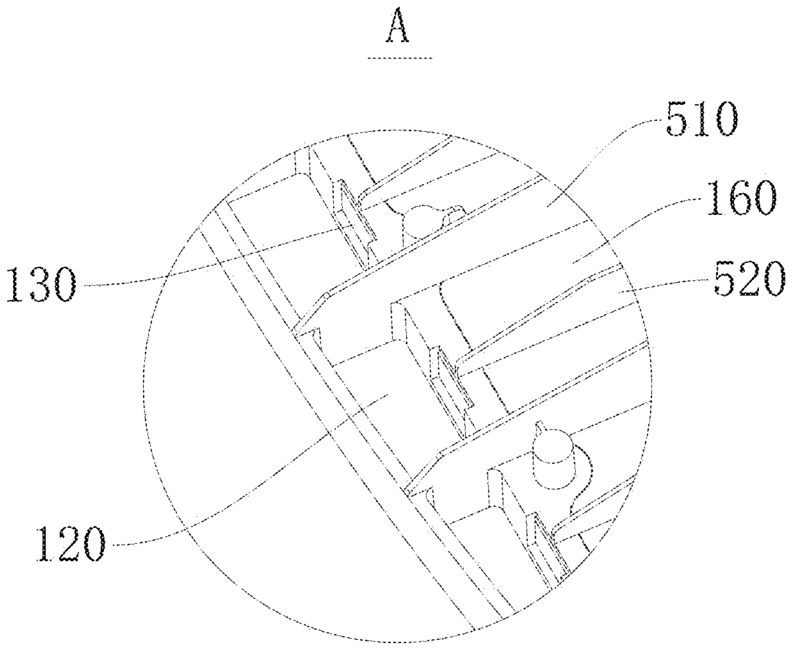
FIG. 2 is an enlarged view of part A in FIG. 1.
Figure 3:
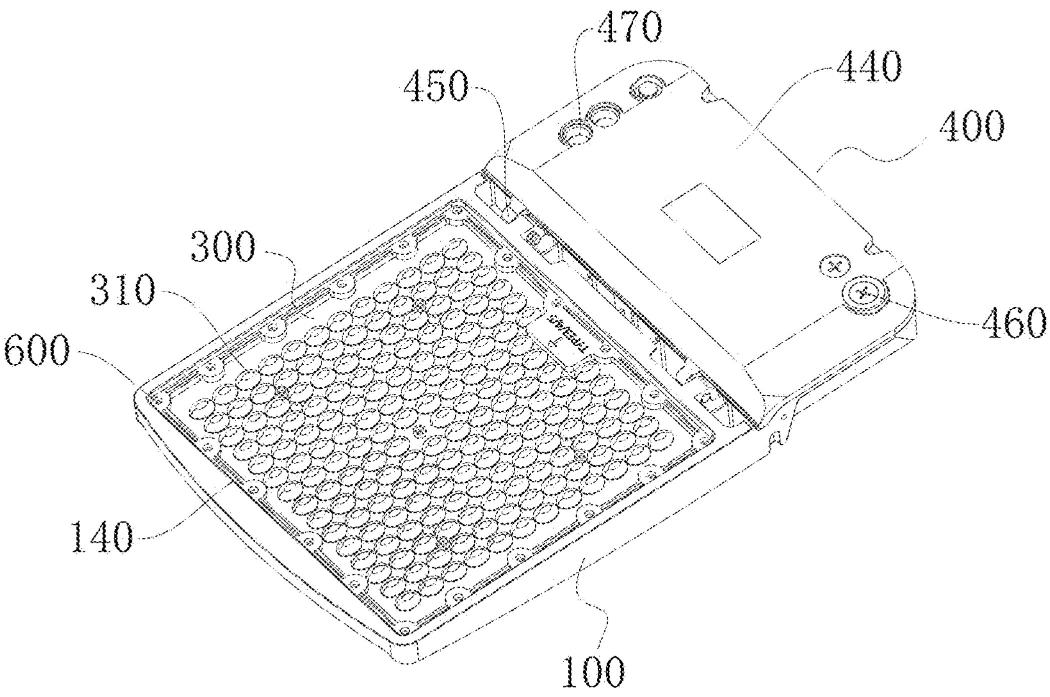
FIG. 3 is a schematic diagram from another perspective of the structure of a shoebox light provided in an embodiment of the present disclosure.
Figure 4:
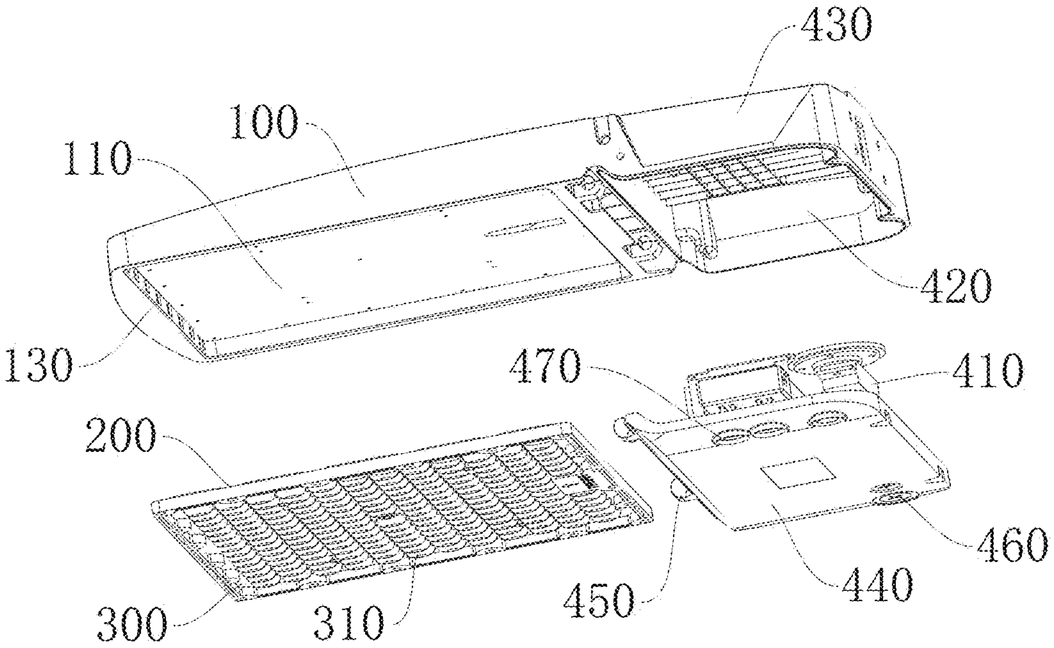
FIG. 4 is an exploded view of a shoebox light provided in an embodiment of the present disclosure.
Figure 5:
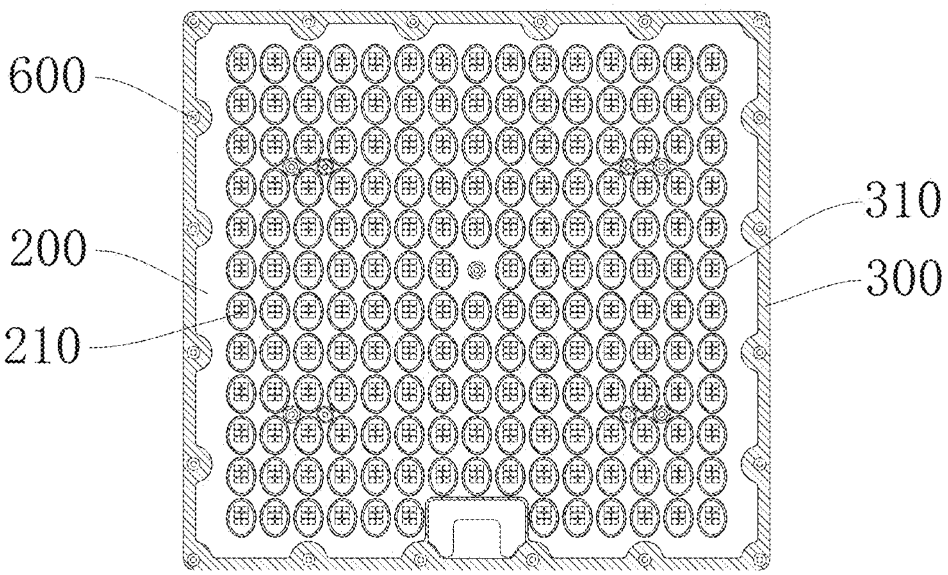
FIG. 5 is a schematic diagram of the structure of a light source plate.
Figure 6:
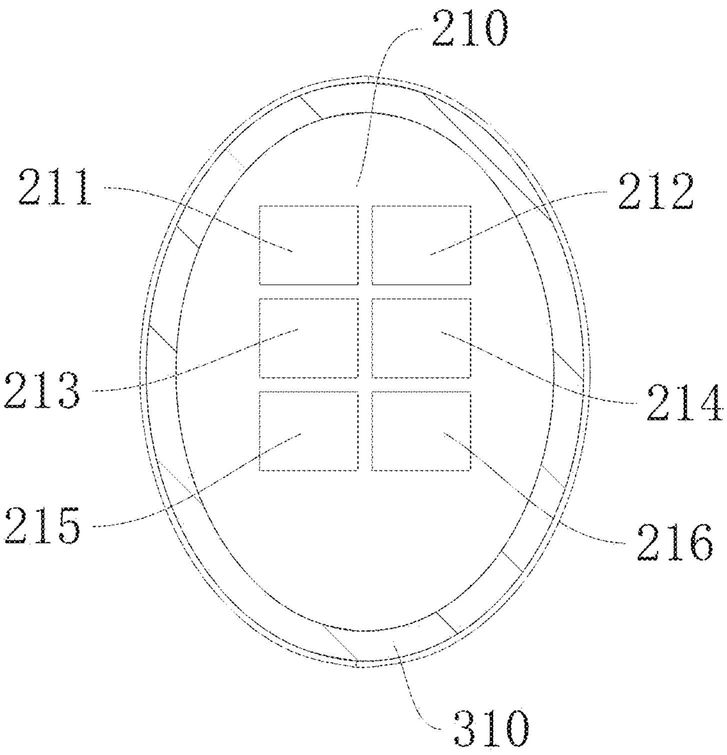
FIG. 6 is a schematic diagram of the structure of a light source assembly.

As shown in FIGS. 1-6, a preferred embodiment of the present disclosure provides a shoebox light, comprising a lamp body 100, a light source plate 200, a lens plate 300, a power supply box 400, and a power supply assembly 410; the power supply box 400 is disposed at one end of the lamp body 100, the light source plate 200 is disposed at a bottom of the lamp body 100, and the light source plate 200 is provided with a plurality of light source assemblies 210 arranged in an array; the lens plate 300 is disposed on a side of the light source plate 200 away from the bottom of the lamp body 100, and is provided with a plurality of optical lens packages 310 in one-to-one correspondence with the plurality of light source assemblies 210.

Each of the plurality of light source assemblies 210 comprises a first lamp bead 211, a second lamp bead 212, a third lamp bead 213, a fourth lamp bead 214, a fifth lamp bead 215, and a sixth lamp bead 216 arranged in three rows and two columns. The first lamp bead 211 and the second lamp bead 212 are positioned in a first row and arranged side by side, the third lamp bead 213 and the fourth lamp bead 214 are positioned in a second row adjacent to the first row and arranged side by side, the fifth lamp bead 215 and the sixth lamp bead 216 are positioned in a third row adjacent to the second row and arranged side by side. The first lamp bead 211, the second lamp bead 212, the third lamp bead 213, the fourth lamp bead 214, the fifth lamp bead 215, and the sixth lamp bead 216 are electrically connected to the power supply assembly 410, and are connected in parallel with one another. When lamp beads in any two rows of the three rows are illuminated or lamp beads in all the three rows are illuminated, emitted light passes through the respective lens optical package 310, resulting in different lighting patterns of the shoebox light.

The power supply box 400 comprises a box body 430 formed with a power supply cavity 420 inside for installing the power supply assembly 410, and a cover body 440 covering the power supply cavity 420 and connected to the box body 430, the cover body 440 is rotatably connected at one end to the bottom of the lamp body 100 via a hinge 450, and fastened at another end to a bottom of the lamp body 100 via a connecting screw 460.

The shoebox light provided in the present disclosure can have different light patterns by turning on or off the corresponding lamp beads in the light source assembly 210, without replacing the lens plate 300, thereby meeting different lighting requirements and making the operation simple and convenient. Additionally, when maintenance of the power supply assembly 410 is needed later, it is only necessary to remove the connecting screw 460 at another end of the lamp body 100 of the power supply box 400. Meanwhile, since said one end of the cover body 440 is rotatably connected to the lamp body 100 via a hinge 450, the cover body 440 will not fall from the lamp body 100, making maintenance convenient and operation simple.

In this embodiment, turning on different combinations of lamp beads in the light source assembly 210 results in different lighting patterns of the shoebox light as follows.

(1) When the first lamp bead 211, the second lamp bead 212, the third lamp bead 213, and the fourth lamp bead 214 are simultaneously illuminated, light emitted by the first lamp bead 211, light emitted by the second lamp bead 212, light emitted by the third lamp bead 213, and light emitted by the fourth lamp bead 214 collectively pass through the respective lens optical package 310, and the lighting pattern of the shoebox light is T3.

(2) When the third lamp bead 213, the fourth lamp bead 214, the fifth lamp bead 215, and the sixth lamp bead 216 are simultaneously illuminated, light emitted by the third lamp bead 213, light emitted by the fourth lamp bead 214, light emitted by the fifth lamp bead 215, and light emitted by the sixth lamp bead 216 collectively pass through the respective lens optical package 310, and the lighting pattern of the shoebox light is T5.

(3) When the first lamp bead 211, the second lamp bead 212, the third lamp bead 213, the fourth lamp bead 214, the fifth lamp bead 215, and the sixth lamp bead 216 are simultaneously illuminated, light emitted by the first lamp bead 211, light emitted by the second lamp bead 212, light emitted by the third lamp bead 213, light emitted by the fourth lamp bead 214, light emitted by the fifth lamp bead 215, and light emitted by the sixth lamp bead 216 collectively pass through the respective lens optical package 310, and the lighting pattern of the shoebox light is T4.

As an example, a top of the lamp body 100 is provided with a heat dissipation assembly 500, and the heat dissipation assembly 500 comprises a plurality of first heat dissipation ribs 510 and a plurality of second heat dissipation ribs 520, each extending from said one end of the lamp body 100 away from the power supply box 400, preferably to one end of the lamp body 100 away from the power supply box 400. The plurality of first heat dissipation ribs 510 have a height less than the plurality of second heat dissipation ribs 520, and the plurality of first heat dissipation ribs 510 and the plurality of second heat dissipation ribs 520 are alternately arranged at intervals. Thus, the arrangement of the heat dissipation assembly 500 enables an increase in the surface area in contact with the air, facilitating the rapid transfer of heat from the heat source (i.e., the light source plate 200) to surrounding air. It should be noted that the plurality of first heat dissipation ribs 510 and the plurality of second heat dissipation ribs 520 have different heights and are arranged at intervals, which ensures the heat dissipation effect and saves costs.

As an example, the power supply box 400 is provided with a module switch 470 for regulating an on-off state of the lamp beads and the lighting patterns. The module switch 470 is electrically connected to the power supply assembly 410, which is simple and convenient in operation. In this example, the module switch 470 is preferably a DIP switch, and the DIP switch comprises three independent switches respectively corresponding to the lighting pattern T3, the lighting pattern T4, and the lighting pattern T5.

As an example, the bottom of the lamp body 100 is provided with a light source cavity 110 for installing the light source plate 200; the top of the lamp body 100 is provided with a drainage groove 120 at an end of the lamp body 100 away from the power supply box 400, a sidewall of the drainage groove 120 is provided with a drainage hole 130 communicating with the light source cavity 110. After the light source plate 200 is installed in the light source cavity 110, a drainage gap 140 is formed between an inner wall of the light source cavity 110 and the light source plate 120. With this design, as the heat dissipation assembly 500 transfers heat to the surrounding air, the surrounding air heats up and expands, rising upwards. The heated surrounding air then condenses into water, and the water accumulates in the drainage groove 120. Finally, the water is discharged from the drainage hole 130 through the drainage gap 140 formed between the inner wall of the light source cavity 110 and the light source plate 200.

Further, a waterproof sealing ring is disposed between the light source plate 200 and the lens plate 300; the lens plate 300 is provided with a plurality of fastening screws 600 distributed along a periphery of the lens plate 300, the lens plate 300 is fastened to the light source plate 200 via the fastening screws 600 so that the lens plate 300 and the light source plate 200 together compress the waterproof sealing ring securely. This design can achieve effective waterproof, avoiding any interference with the normal operation of the light source assembly 210 on the light source plate 200, and thus avoiding any impact on the optical performance of the shoebox light.

Furthermore, in order to enhance drainage efficiency, the top of the lamp body 100 is provided with an inclined surface 150 descending downward from said one end of the lamp body 100 the power supply box 400 is disposed toward the end of the lamp body 100 away the power supply box 400, where the drainage groove 120 is disposed. The plurality of first heat dissipation ribs 510 and the plurality of second heat dissipation ribs 520 are disposed on the inclined surface 150, and water guide channels 160 are formed by the plurality of first heat dissipation ribs 510, the plurality of second heat dissipation ribs 520, and the inclined surface 150.

In the description of the present disclosure, it should be noted that unless otherwise specified or limited, the terms "connected", and "connection" should be understood in a broad sense. As an example, it can be a fixed connection, a detachable connection, or an integral connection; it can be a mechanical connection or an electrical connection; it can be a direct connection or an indirect connection through an intermediate medium; it can be communication between two assemblies. For those skilled in the art, the specific meaning of the above terms in the present disclosure can be understood based on the specific situation.

The above are only the preferred embodiments of the present disclosure. It should be pointed out that for those skilled in the art in this field, without departing from the technical principles of the present disclosure, various improvements, and substitutions can be made, and these improvements, and substitutions should also be regarded as within the scope of protection of the present disclosure.

What is claimed is:

1. A shoebox light, comprising a lamp body, a light source plate, a lens plate, a power supply box, and a power supply assembly, wherein the power supply box is disposed at one end of the lamp body, the light source plate is disposed at a bottom of the lamp body, and the light source plate is provided with a plurality of light source assemblies arranged in an array;

the lens plate is disposed on a side of the light source plate away from the bottom of the lamp body, and is provided with a plurality of optical lens packages in one-to-one correspondence with the plurality of light source assemblies;

each of the plurality of light source assemblies comprises a first lamp bead, a second lamp bead, a third lamp bead, a fourth lamp bead, a fifth lamp bead, and a sixth lamp bead arranged in three rows and two columns, wherein:

the first lamp bead, and the second lamp bead are positioned in a first row and arranged side by side, the third lamp bead, and the fourth lamp bead are positioned in a second row adjacent to the first row and arranged side by side, the fifth lamp bead, and the sixth lamp bead are positioned in a third row adjacent to the second row, and arranged side by side;

the first lamp bead, the second lamp bead, the third lamp bead, the fourth lamp bead, the fifth lamp bead, and the sixth lamp bead are electrically connected to the power supply assembly, and are connected in parallel with one another;

when lamp beads in any two rows of the three rows are illuminated or lamp beads in all the three rows are illuminated, emitted light passes through the respective lens optical package, resulting in different lighting patterns of the shoebox light;

the power supply box comprises:

a box body, formed with a power supply cavity inside for installing the power supply assembly, and a cover body, covering the power supply cavity and connected to the box body, wherein one end of the cover body is rotatably connected to the bottom of the lamp body via a hinge, and an opposite end of the cover body is fastened to a bottom of the box body via a connection screw.

2. The shoebox light according to claim 1, wherein when the first lamp bead, the second lamp bead, the third lamp bead, and the fourth lamp bead are simultaneously illuminated, light emitted by the first lamp bead, light emitted by the second lamp bead, light emitted by the third lamp bead, and light emitted by the fourth lamp bead collectively pass through the respective lens optical package, and the lighting pattern of the shoebox light is T3.

3. The shoebox light according to claim 1, wherein when the third lamp bead, the fourth lamp bead, the fifth lamp bead, and the sixth lamp bead are simultaneously illuminated, light emitted by the third lamp bead, light emitted by the fourth lamp bead, light emitted by the fifth lamp bead, and light emitted by the sixth lamp bead collectively pass through the respective lens optical package, and the lighting pattern of the shoebox light is T5.

4. The shoebox light according to claim 1, wherein when the first lamp bead, the second lamp bead, the third lamp bead, the fourth lamp bead, the fifth lamp bead, and the sixth lamp bead are simultaneously illuminated, light emitted by the first lamp bead, light emitted by the second lamp bead, light emitted by the third lamp bead, light emitted by the fourth lamp bead, light emitted by the fifth lamp bead, and light emitted by the sixth lamp bead collectively pass through the respective lens optical package, and the lighting pattern of the shoebox light is T4.

5. The shoebox light according to claim 1, wherein a top of the lamp body is provided with a heat dissipation assembly, and the heat dissipation assembly comprises a plurality of first heat dissipation ribs and a plurality of second heat dissipation ribs, each extending from said one end of the lamp body away from the power supply box of the lamp body;

the plurality of first heat dissipation ribs have a height less than the plurality of second heat dissipation ribs, and the plurality of first heat dissipation ribs and the plurality of second heat dissipation ribs are alternately arranged at intervals.

6. The shoebox light according to claim 5, wherein the bottom of the lamp body is provided with a light source cavity for installing the light source plate;

the top of the lamp body is provided with a drainage groove at an end of the lamp body away from the power supply box, a sidewall of the drainage groove is provided with a drainage hole communicating with the light source cavity;

after the light source plate is installed in the light source cavity, a drainage gap is formed between an inner wall of the light source cavity and the light source plate.

7. The shoebox light according to claim 6, wherein the top of the lamp body is provided with an inclined surface descending downward from said one end of the lamp body where the power supply box is disposed toward the end of the lamp body away from the power supply box, the plurality of first heat dissipation ribs and the plurality of second heat dissipation ribs are disposed on the inclined surface, and water guide channels are formed by the plurality of first heat dissipation ribs, the plurality of second heat dissipation ribs, and the inclined surface.

8. The shoebox light according to claim 6, wherein a waterproof sealing ring is disposed between the light source plate and the lens plate, the lens plate is provided with a plurality of fastening screws distributed along a periphery of the lens plate, the lens plate is fastened to the light source plate via the fastening screws so that the lens plate and the light source plate together compress the waterproof sealing ring securely.

9. The shoebox light according to claim 1, wherein the power supply box is provided with a module switch for regulating an on/off state of the lamp beads and the lighting pattern, and the module switch is electrically connected to the power supply assembly.

* * * * *